United States Patent [19]

Belyshev

[11] 4,079,829

[45] Mar. 21, 1978

[54] DEVICE FOR ASSEMBLING CYLINDRICAL PRIMARY CURRENT SOURCES

[76] Inventor: Leonid Lavrentievich Belyshev, ulitsa Akademika Komarova, 19, kv. 52, Moscow, U.S.S.R.

[21] Appl. No.: 746,386

[22] Filed: Dec. 1, 1976

[51] Int. Cl.² .................................... B65G 25/00
[52] U.S. Cl. ................................ 198/345; 198/425; 198/459
[58] Field of Search ............... 198/345, 339, 459, 434, 198/425

[56] References Cited

U.S. PATENT DOCUMENTS

| 3,424,209 | 6/1969 | Settembrini | 198/345 X |
| 3,814,232 | 6/1974 | Eriksson | 198/339 |

FOREIGN PATENT DOCUMENTS 1,061,677  7/1959  Germany ..................... 198/459

*Primary Examiner*—Bruce H. Stoner, Jr.
*Assistant Examiner*—Douglas D. Watts
*Attorney, Agent, or Firm*—J. Harold Nissen

[57] ABSTRACT

A device for assembling cylindrical primary current sources intended for use in assembly line production where high output and reliability are of major importance. It comprises a conveyor, a feed rotor, an arm and guides for delivering to the working tools a group of cylindrical cells in a row, and a rack with teeth whose length decreases uniformly from the rack center to its ends, said rack being intended to fix the cylindrical cells in working positions, and a drive motor with a synchronizing mechanism which has the first, second and third shafts, the third shaft being provided with cams kinematically linked with the working tools, the rack and the arm.

4 Claims, 5 Drawing Figures

DEVICE FOR ASSEMBLING CYLINDRICAL PRIMARY CURRENT SOURCES

The present invention relates to the means of production of primary current sources and more particularly it relates to a device for assembling cylindrical primary current sources which can be utilized for applying a layer of thickened electrolyte to the inner surface of the cylindrical cells, or pressing the positive compound into the cylindrical cells, pressfitting the carbon terminal, installing the upper washer, pouring in the insulating compound and checking the primary cells for voltage.

Known in the prior art are devices for assembling the cylindrical primary current sources.

The known device comprises a conveying means feeding the cells one by one at a certain pitch to the working tool located in fixed guides. The working tool is provided with a centering appliance which fixes the cells in the working zone wherein the assembly operations are performed.

This known device for assembling cylindrical primary current sources incorporates only one working tool which reduces considerably the efficiency of the device when it is used for assembly operations of a comparatively long duration.

Another known device for assembling cylindrical primary current sources is devoid of the afore-mentioned disadvantage and has two or three working positions for consecutive performance of assembly operations. Here the working tools are arranged above the edge of a disc which is periodically turned through a certain angle between two working positions, feeding the work accomodated on the disc sockets to the working tools. At the disc stops the assembly operations are performed simultaneously in all the working positions.

However, for attaining higher efficiency in assembling the current sources with the aid of this known device it becomes necessary to install additional working tools which increases the dimensions of the disc and, consequently, increases the inertia loads which impair the accuracy of fixing the disc in the working positions.

Also known is a device for assembling primary current sources of a cylindrical shape which has a working rotor equipped with working tools on the periphery thereof, and two conveying rotors which feed the cells to the working tools and receive the assembled cells, the assembly operations being performed during rotation of the working rotor.

Inasmuch as the working rotor in this device does not stop, there are no inertia loads, but the provision of conveying rotors for feeding the cells onto the working rotor and receiving the finished articles from said rotor rasies the metal content of the device, particularly in the case of long-cycle assembly operations.

Besides, the assembly conditions of the current sources involve the necessity of delivering materials to the rotating working tools at a high pressure which calls for the use of special complicated and expensive units to guarantee leakproof delivery of the materials. This requires particularly tight connections at the point of contact between the movable and fixed parts.

In addition, when highly corrosive materials are delivered to the rotating working tools, the reliability of the device is reduced.

As a measure of protection, the joints with friction surfaces are made of titanium.

However, the antifriction properties of titanium are very low and the friction parts wear out rapidly, thus raising operating expenses.

There is still another device for assembling cylindrical primary current sources which is free from all the abovementioned disadvantages and incorporates an appliance for delivering cassettes to the working tools, said cassettes holding a group of cylindrical cells arranged in rows, the number of said cells in the rows perpendicular to the direction of movement of the cassette over guide rails being equal to the number of the working tools. The known device also has a mechanism for fixing the cylindrical cells in working positions under the corresponding tools, said mechanism being made in the form of a crosshead with fixing holes and rings whose number corresponds to the number of the working tools.

This crosshead is arranged in such a manner as to ensure fixing of the upper part of the cells in the row of the cassette perpendicular to the direction of movement of the latter.

Besides, there is a group of working tools arranged in a row, intended to perform a certain assembly operation and located above the zone of the working positions, and a drive with a mechanism for synchronizing the assembly operations in conformity with the preset program.

Said drive with the synchronizing mechanisms brings the first row of cells in the cassette under the group of the working tools, moves the crosshead for fixing the first row of the cells in the cassette, brings the working tools to said cells and withdraws said tools and crosshead from the cassette cells after which it brings the second row of cells in the cassette under the group of the working tools.

The known device for assembling cylindrical primary current sources fails to ensure sufficient accuracy in the working positions of the cells whose height is two or three times greater than their diameter since the cells are secured in the upper part only.

Additional fixing of the cells in the lower part is possible only by complicating the design of the cassette which will raise its cost.

Besides, the cassettes proper also make the device and the conditions of its operation more complicated.

These difficulties are caused by the necessity of procuring additional floor areas for storing the cassettes, additional expenses for their manufacture and repairs, additional expenditures of labor for installing the cells into the cassettes, unloading them and returning them for reloading.

All these factors reduce the efficiency of the process and hamper the effective utilization of said known device for assembling cylindrical primary current sources under the conditions of assembly line production.

The attempts to step up the efficiency of the process by increasing the number of the working tools in a group results in increased dimensions of the cassette and, consequently, hinders operation of the device due to a heavy weight of the cassette.

The use of cassettes cannot ensure the required stability and synchronism of operation with the mechanism which perform the preceding and succeeding assembly operations.

According to the above considerations an object of the present invention resides in providing a device for assembling cylindrical primary current sources which would ensure a high accuracy of fixing the cells fed to the zone of the working tools during primary cell assembly operations at the same time guaranteeing a high efficiency, operational reliability and featuring comparatively low metal content.

Another object of the invention resides in providing a device which would ensure stable and synchronous operation with the mechanisms intended to perform the preceding and succeeding assembly operations.

Still another object of the invention resides in providing a device which would deliver a group of cells into the working zone within a minimum possible time with subsequent prompt spacing them at a certain pitch and fixing under the working tools.

A further object of the invention resides in providing a device for assembling cylindrical primary current sources which would ensure, if so required by the assembly conditions, reliable delivery to the working tools of highly-corrosive materials fed under a high pressure (up to 250 kg/cm$^2$).

In accordance with these and other objects the present invention consists in providing a device for assembling cylindrical primary current sources comprising an appliance which feeds a group of cylindrical cells arranged in a row to the working tools, the number of said cells corresponding to the number of the working tools, a mechanism for fixing the group of cylindrical cells in the working positions under the corresponding tools, a group of working tools in a row for performing a preset assembly operation, said group being located above the zone of the working positions, and a drive motor with a mechanism for synchronizing the assembly operations performed according to a preset program wherein, according to the invention, the appliance feeding a group of cylindrical cells arranged in a row comprises a conveyor with a feed rotor at the end, guides arranged tangentially to the feed rotor, and an arm installed with provision for moving between the guides, while the mechanism for fixing the group of cylindrical cells in the working positions is made in the form of a rack with cutouts whose width is equal to the diameter of the cylindrical cells and with teeth whose length decreases uniformly from the centre of the rack towards its ends, the plane of said rack being perpendicular to the guides which have ports for the passage of the rack teeth, the central tooth of the rack having a two-sided cut at the end whose angle is less than 90° whereas the side teeth which are symmetrical with the central tooth have identical onesided external cuts on the ends, said cuts being parallel to the nearest cut on the central tooth and arranged at an angle less than 45°, and the top of each consecutive side tooth is located lower than the apex of the obtuse angle of the cut on the preceding tooth.

It is practicable that the mechanism for synchronizing the assembly operations performed in accordance with a preset program should comprise a first, second and third shafts coupled with the drive motor, the third shaft having cams with profiles corresponding to the preset program and installed on said third shaft at preset positions relative to one another to ensure the required sequence of assembly operations, the end of the first shaft being coupled mechanically with the ends of the second and third shafts by a gear whose speed ratio is determined by the program of the assembly operations; the first cams are kinematically linked with the working tools and reciprocate them during rotation of the third shaft, the second cam is kinematically linked with the rack and reciprocates it during rotation of the third shaft, the third cam is kinematically linked with the arm and reciprocates it along the guides during rotation of the third shaft whereas the second shaft is kinematically linked with the conveyor and feed rotor.

Other objects and advantages of the present invention will become apparent from the description that follows and from the accompanying drawings, in which.

Figure 1:
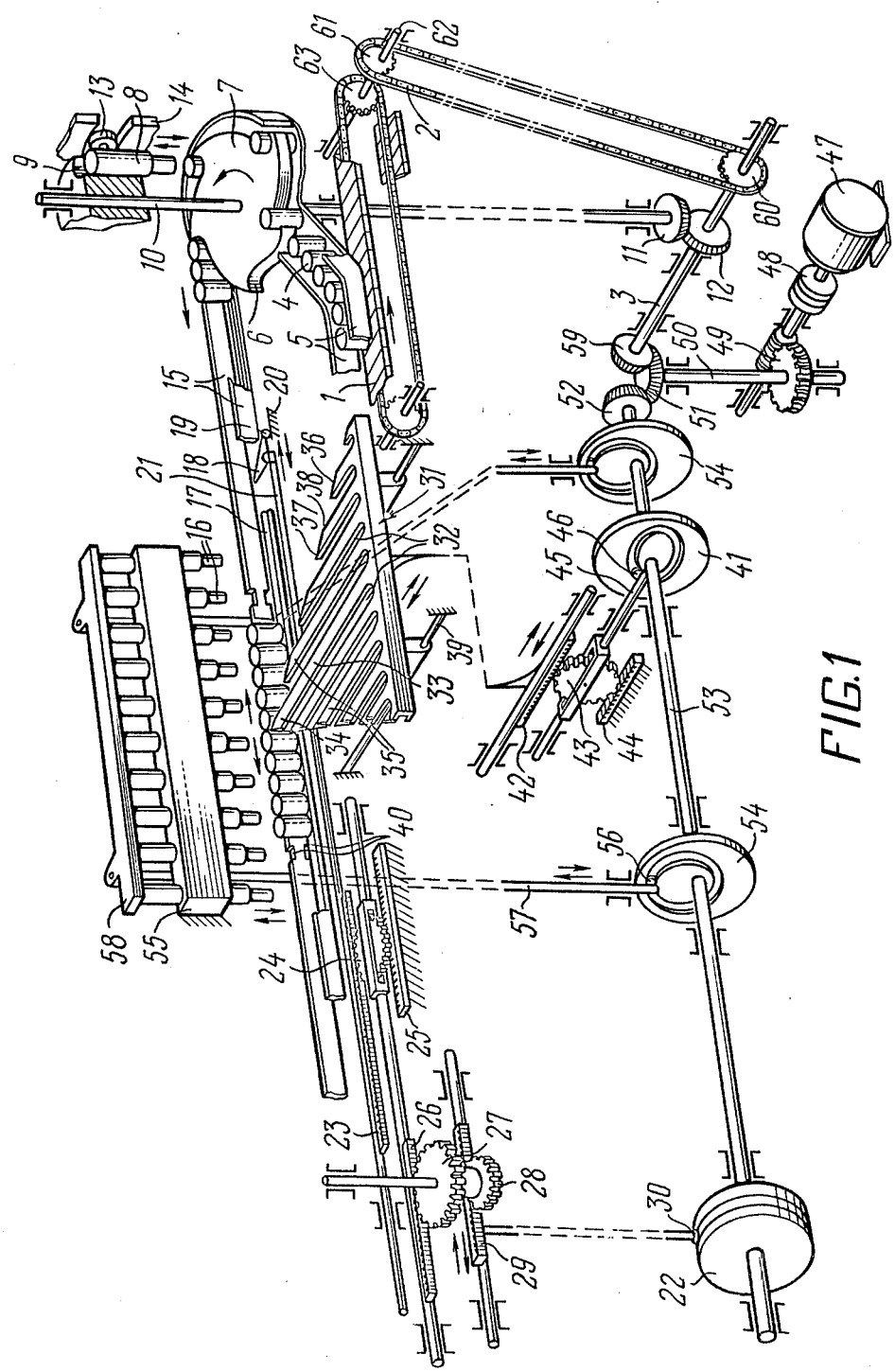
FIG. 1 is a schematic general view of the device for assembling cylindrical primary current sources according to the invention.

The device for assembling cylindrical current sources comprises a conveyor 1 (FIG. 1) connected mechanically by a chain transmission 2 with an intermediate shaft 3 and ensuring continuous supply of cylindrical cells 4 over guides 5 to the working positions 6 of a feed rotor 7.

Located in each working position 6 is a working tool 8 secured with provision for reciprocating along the guides 9 which are rigidly connected with the shaft 10 of the feed rotor 7.

The shaft 10 is kinematically linked by gears 11 and 12 with the intermediate shaft 3.

The working tool 8 is provided with a roller 13 capable of moving over a fixed master form 14.

Arranged tangentially to the feed rotor 7 are guides 15 with a row of working tools 16 above them.

The working tools 16 are made in the form of cylindrical mandrels with a diameter ensuring a minimum clearance when said tools 16 move in the cylindrical cells 4 and intended for applying a layer of thickened electrolyte thinner than 1 mm to the preset height of the inner surface of the cell 4.

A cutout 17 between the guides 15 accommodates an arm 18 with a roller 19 which is capable of moving over a master form 20.

The arm 18 is articulated to a rod 21 linked kinematically with a cam 22 via a gear rack 23, a gear 24 meshing with a fixed gear rack 25, a gear rack 26, gears 27 and 28, a gear rack 29 and a roller 30.

The mechanism for fixing the cylindrical cells 4 in the working positions under the corresponding working tools 16 comprises a rack 31 with cutouts 32 whose width corresponds to the diameter of the cylindrical cell 4.

The central tooth 33 of the rack 31 has a two-sided cut at the end 34, the angle between the cut sides being not greater than 90°.

The ends 36 of the side teeth 35 of the rack 31 arranged symmetrically relative to the central tooth 33 have identical one-sided external cuts which are parallel to the nearest cut of the central tooth 33 and whose angle is not over 45°.

The top 37 of each successive side tooth 35 is not higher than the apex 38 of the obtuse angle of the cut on the peceding side tooth 35 or central tooth 33.

The rack 31 is mounted on guides 39 and the plane of said rack 31 is perpendicular to the guides 15 and to the plane of movement of the working tools 16.

The guides 15 have ports 40 for the passage of the teeth 33 and 35 of the rack 31.

The rack 31 is kinematically linked with the cam 41 via a gear rack 42, gear 43 meshing with a fixed gear rack 44, a rod 45 and a roller 46.

The device also incorporates a drive motor 47 and a mechanism for synchronizing the assembly operations performed according to a preset program, said mechanism consisting of a coupling 48, a worm reduction unit 49, a shaft 50 transmitting rotation via gears 51 and 52 to a camshaft 53 carrying cams 54 for reciprocating the working tools 16 in accordance with a preset program, said tools being accommodated in a fixed housing 55 and receiving said reciprocating motion via a roller 56, rod 57 crosshead 58.

The rack 31 is reciprocated in accordance with the preset program by means of the roller 41 of the camshaft 53.

Each cam 22, 41 and 54 of the camshaft 53 has a profile of its own corresponding to the preset program and is set relative to another cam in a certain position which ensures the required sequence of assembly operations.

The synchronous operation of the feed rotor 7 is ensured by the appropriate speed ratio of the gear 51 and of the gear 59 installed on the intermediate shaft 3, also by a constant pressure of the cylindrical cells 4 in the guides 5, said pressure being maintained by the corresponding speed of the conveyor 1.

This speed can be changed to suit the speed ratio of a sprocket 60 secured on the intermediate shaft 3 and a sprocket 61 mounted on a shaft 62.

The driving sprocket 63 of the conveyor 1 is also mounted on the shaft 62.

Figure 2:
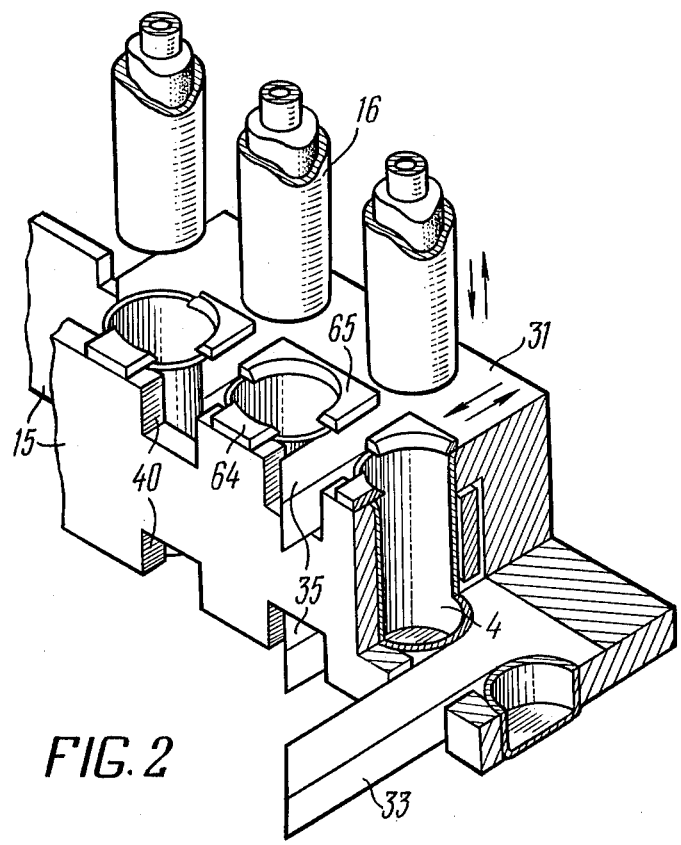
FIG. 2 shows the relative positions of the working tools, rack and cylindrical cells in the guides at the moment of fixing the cells in the working positions, according to the invention, with partial cutouts of the guides and rack.

FIG. 2 shows the relative positions of the rack 31, working tools 16, guides 15 and cylindrical cells 4 at the moment the rack 31 is introduced for fixing the cylindrical cells 4 in the working positions. It can be seen in the figure that the rack 31 consists of two sections of teeth 35 and 33 arranged one under the other. The rack 31 being of this shape, the guides 15 have ports 40 made to the shape of the teeth 33 and 35 entering the guides at the moment when the cylindrical cells are being fixed in their working positions.

Such ports 40 are made in the last guide 15 along the movement of the rack 31.

The first one of the guides 15 has recesses whose depth corresponds to the thickness of the first and second sections of the rack 31.

The last guide 15 along the movement of the rack 31 has stops 64 at the points where the cylindrical cells 4 are fixed under the working tools 16, said stops intended to prevent axial displacement of the cylindrical cells 4 at the moment of an assembly operation.

The rack 31 is provided with stops 65 similar to the stops 64. The stops 65 and 64 have recesses along the arc of a circumference whose diameter corresponds to the diameter of the working tool 16 and is somewhat larger than the diameter of the cylindrical cell 4.

The device for assembling cylindrical primary current sources operates as follows.

The cylindrical cells 4 (FIG. 1) are delivered from the precesing technological position to the conveyor 1 which moves at a speed of 0.38 m/s.

Besides, the cylindrical cells 4 may be fed onto the conveyor 1 from an intermediate storing container not shown in the drawing.

The moving conveyor 1 ensures a constant pressure of the cells 4 in the guides 5 before the feed rotor 7.

The slat-type conveyor 1 is powered by a driving sprocket 63 rotating at a speed of 91 rpm. This rotation speed is ensured by the speed ratio of 3.8 between the sprocket 61 and the sprocket 60 of the intermediate shaft 3.

Meanwhile, the feed rotor 7 is rotating continuously at a speed of 24 rpm.

As the feed rotor 7 passes by each of the five working positions, past the outlet from the guides 5, the cylindrical cells 4 are moved by the pressure created by the conveyor 1 and occupy the working positions 6.

As the cylindrical cells 4 are conveyed from the guides 5 to the guides 15 by the feed rotor 1, the upper edges of said cells are calibrated and flared out.

At the same time the working tools 8 whose number corresponds to the number of the working positions 6 make a working stroke of 45 mm.

On completion of these technological operations the cylindrical cells 4 are inserted into the guides 15 with 0.5 s intervals where a group of ten cylindrical cells 4 is formed to correspond to ten working tools 16.

The formed group of the cylindrical cells 4 is shifted by the arm 18 to such a position in the guides 15 when the middle of the cell group 4 comes to the level of the top 34 of the central tooth 33 of the rack 31.

The movement of the arm 18 begins at the moment when the last cylindrical cell 4 of the formed group is still in the working position 6 of rotor 7 and its introduction into the guides 15 calls for moving the feed rotor 7 through an angle of 40°.

The shaft 10 of the feed rotor 7 is kinematically linked with the shaft 50 of the synchronizing mechanism by the gears 11, 12, 59 and 51 at a speed ratio of 2.

The rod 21 carrying the arm 18 also has a kinematic linkage with the shaft 50 via the rack 23, gear 24, rack 25, rack 26, gear 27, gear 28, rack 29, roller 30, cam 22, camshaft 53, gear 52 and gear 51.

The gear drives ensure a total speed ratio of 9.2, the working stroke of the cam 22 is 63 mm and its profile obeys the law of cosinusoid.

The position of the cam 22 on the camshaft 53 answers the condition under which the arm 18 starts moving at the moment when the last cylindrical cell 4 of the formed group has not yet been introduced into the guides 15 and is in the working position 6 of the feed rotor 7 at a distance equal to the length of the arc limited by an angle of 40°.

The initial position of the arm 18 is vertical which is ensured by the corresponding profile of the master form 20.

As soon as the arm 18 passes the zone where the cylindrical cells 4 leave the working positions 6 of the rotor 7, the last cylindrical cell 4 of the formed group enters the guides 15.

Having completed a full working stroke which is equal to 580 mm for the primary cells Type R20, the arm 18 comes back to the initial position.

During its return travel which is equal to 120 mm the arm 18 is brought to a horizontal position, sinking into the cutout 17.

The mechanism for fixing the cylindrical cells 4 in the working positions starts operating at the moment when the group of the cylindrical cells 4 is at 55 mm from the center of the working position zone.

This is achieved by coordinating the position of the cam 41 relative to the cam 22.

The profile of the cam 22 obeys the law of cosinusoid on a sector of 72°. This makes it possible to execute a working stroke, to move the rack 31 towards the group of the cylindrical cells 4, to locate said cells 4 in the working positions at a pitch corresponding to the pitch of the working tools 16, and to fix the cells 4 under the working tools 16, all in one second.

However, this time is not a limit; by using the device of this construction, the duration of the above-listed operations can be reduced to 0.5 s.

Figure 3:
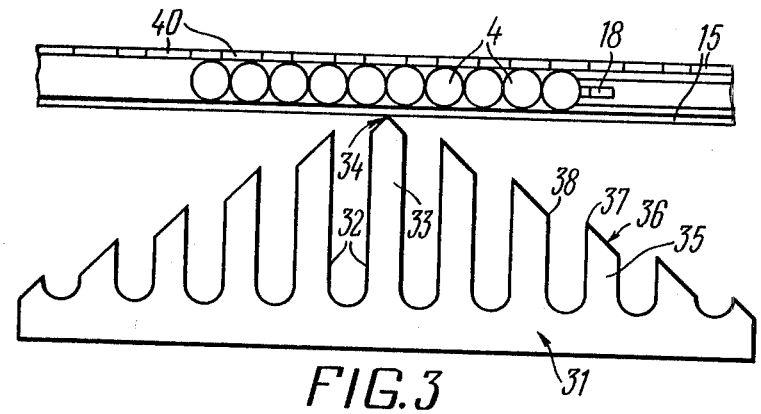
FIG. 3 shows schematically the initial extreme position of the rack relative to the row of cylindrical cells according to the invention.
Figure 4:
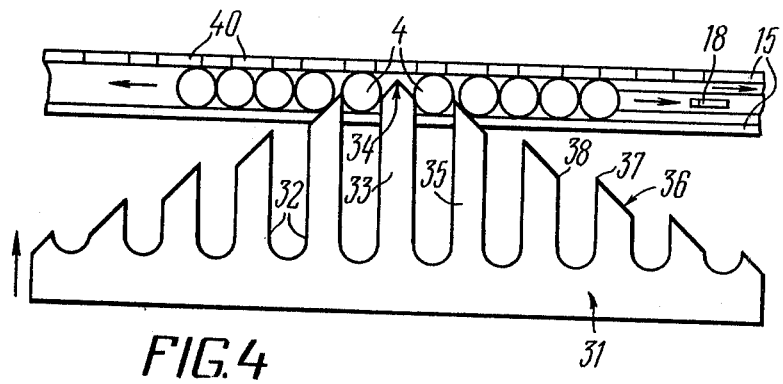
FIG. 4 shows schematically the intermediate position of the rack relative to the cylindrical cells, according to the invention.
Figure 5:
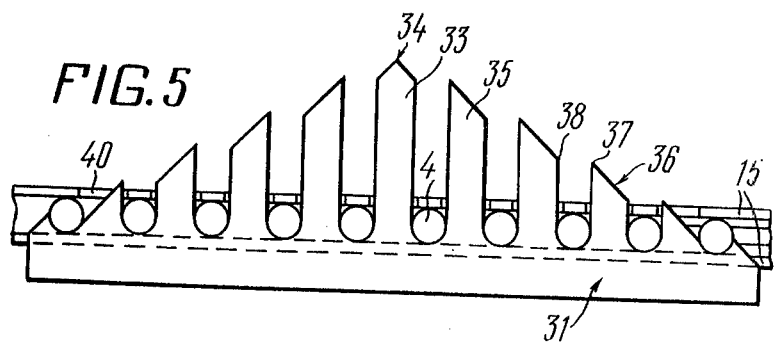
FIG. 5 shows the final extreme position of the rack relative to the row of fixed cylindrical cells according to the invention.

Shown conventionally in FIGS. 3, 4 and 5 are various positions of the rack 31 during installation and fixing of the cylindrical cells 4 under the working tools 16 (FIG. 1).

In the position shown in FIG. 3 the group of ten cylindrical cells 4 in a row is brought to the center of the zone of working positions while the rack 31 is brought to said zone and its central tooth 33 is located opposite the middle of the group of cells 4.

FIG. 4 shows how the teeth 33 and 35 of the rack 31 start penetrating gradually into the gaps between the cylindrical cells 4, forcing them apart to a pitch corresponding to that of the working tools 16 (FIG. 1).

Finally, FIG. 5 shows the final position of the rack 31 wherein the group of cylindrical cells 4 in a row is fixed by the rack 31 in the required working positions.

After the cells 4 have been fixed under the working tools 16, (FIG. 1), a layer of thickened electrolyte is applied to the inner surface of the cylindrical cells 4.

The working tools 16 start moving toward the cells 4 when the time remaining to complete the fixing of the cells 4 in the working positions is sufficient for turning the cam 41 through 10°. To ensure this condition, the cams 54 are set in a certain position relative to the cam 41.

The cams 54 rotated by the camshaft 53 which is kinematically linked with the shaft 50 by the gears 52 and 51 at a speed ratio of 1 transmit reciprocating motion to the working tools 16.

The total travel of the working tools 16 is 65 mm and the thickened electrolyte is applied to the inner walls of ten cylindrical cells 4 to a height of 50 mm within 0.89 s.

After completing the technological operation with the aid of the working tools 16, the rack 31 resumes its initial position; it starts moving from the cells 4 at the moment when the time remaining for the completion of the travel of the working tools 16 becomes sufficient for turning the cam 41 through 10°.

While the rack 31 is returning to the initial position and its remaining travel is equal to 15 mm, the arm 18 begins moving the next group of cylindrical cells 4 to the center of the zone of the working positions, at the same time moving the preceding group of cylindrical cells 4 with the applied layer of thickened electrolyte farther along the guides 15 for the execution of the next technological operation.

The device for assembling cylindrical primary current sources according to the invention makes it possible to carry out calibration of the cylindrical cells 4 consisting in removal of probable burrs and for slightly flaring out the upper part of the cells 4.

This calibration is performed while the cylindrical cells 4 are conveyed in the working positions 6 of the feed rotor 7.

After calibration, the inner surface of the cylindrical cells 4 located in the zone of the working positions is coated with a layer of thickened electrolyte.

An advantage of the device lies in that it can be used for other technological operations related to assembly of cylindrical primary current sources.

For example it is possible to press the positive compound into the cylindrical cells 4.

This operation consists of batching out the positive compound and pressing it into the cells 4 which have been first provided with separators.

If the separators (insulating gaskets) are not inserted into the cells 4 during the preceding assembly operations, they can be inserted and positioned on the bottom of the cells 4 with the aid of the working tools 8 of an appropriate design which can carry out this operation while the cells 4 are moved in the working position 6 of the feed rotor 7.

Besides, the device can be utilized for pressing a carbon terminal into the cells 4, the preceding operation, i.e. puncturing the guide hole in the positive electrode located inside the cell 4 being carried out by appropriate working tools 8 while the cells 4 are being moved in the working positions 6 of the feed rotor 7.

In addition, the device according to the invention can be employed for such operations as installation of the upper washer pouring in the insulating compound and for voltage checks carried out by the working tools 16 specially adapted for these operations.

In this case the rotor 7 is used only for feeding the cylindrical cells 4 into the guides 15 and the profiles of the cams 54 are shaped to suit the operational program and are installed on the camshaft 53 in accordance with the working cycle of the entire device.

The profile of the fixed master form 14 of the feed rotor 7 is also changed to suit the corresponding operation.

The device for assembling cylindrical current sources according to the invention ensures the delivery of a group of cells 4 into the zone of working positions in a minimum time with subsequent rapid spacing them to a preset pitch and accurate fixing under the working tools 16.

All these features raise the output and reliability of the device thus rendering it highly effective under the conditions of assembly line production.

For example, the use of a device whose rack 31 and guides 15 are designed as illustrated in FIG. 2 raises the output to 220 cells per minute which amounts to 13200 cells per hour.

The device of such a design (FIG. 1) can be used successfully for assembly operations in other branches of industry.

For example, it can be used for metering various liquids into cylindrical vessels, for batching and packing bulk materials as well as granules and tablets.

For this purpose it is enough to choose the required sequence of operation of the working tools 8 and 16 to suit the characteristic features of the material handled, and to take in account their distinctive design features since the working tools 8 of the feed rotor 7 reciprocate relative to the cylindrical cell 4 and simultaneously rotate together with the latter around an axis which is parallel to the central axis of the rotor 7.

All these motions are executed in the course of conveying the cylindrical cells 4 in the working positions 6. The tools 16 execute only a reciprocating motion relative to the cylindrical cells 4 fixed in the working positions.

What we claim is:

1. A device for assembling cylindrical primary current sources comprising:

a group of working tools arranged in a row above the zone of working positions;

an appliance delivering to said working tools a group of cylindrical cells in a row, the number of said cells corresponding to that of said working tools;

a mechanism for fixing said group of said cylindrical cells in said working positions under said working tools made in the form of a rack with cutouts whose width corresponds to the diameter of said cylindrical cells and with teeth whose length decreases uniformly from the center of said rack towards its ends;

a drive motor;

a mechanism for synchronizing the assembly operations performed in accordance with a preset program;

a conveyor of said appliance for delivering said group of cylindrical cells arranged in a row;

a feed rotor of said appliance for delivering said group of said cylindrical cells arranged in a row, said rotor being located at the end of said conveyor;

guides of said appliance for delivering said group of cylindrical cells in a row, arranged tangentially to said feed rotor and having ports for the passage of said teeth of said rack, said guides lying in parallel planes;

an arm of said appliance for delivering said group of cylindrical cells arranged in a row, said arm being located between said guides with a provision for reciprocating motion;

a central tooth of said rack provided with a two-sided cut at the end thereof at an angle which is smaller than 90°; and side teeth of said rack arranged symmetrically to the nearest cut of said central tooth and provided with identical one-sided external cuts at the ends, the angle of said cuts being smaller than 45° and the top of each successive side tooth is lower than the apex of the obtuse angle of cut of the preceding tooth.

2. A device according to claim 1 wherein said mechanism for synchronizing the assembly operations performed in accordance with a preset program comprises:

a first shaft of said synchronizing mechanism whose first end is linked kinematically with said drive motor;

a second shaft of said synchronizing mechanism kinematically linked with said conveyor and said rotor;

a third shaft of said synchronizing mechanism;

first cams installed on said third shaft and having profiles corresponding to a preset program and linked kinematically with said working tools to reciprocate the latter during rotation of said third shaft;

a second cam secured on said third shaft in a preset position relative to said first cams, having a profile of its own and linked kinematically with the rack to reciprocate the latter during rotation of said third shaft;

a third cam secured on said third shaft in a preset position relative to said first and second cams, having a profile of its own to correspond to the preset program and linked kinematically with said arm to reciprocate the latter along said guides during rotation of said third shaft; and, the other end of said first shaft is mechanically coupled with the ends of said second and third shafts by gears at a speed ratio determined by the program of assembly operations.

3. A device according to claim 1, wherein:

the planes of said guides are perpendicular to the plane of said rack; and, the plane of the central tooth of said rack is perpendicular to said guides.

4. A device according to claim 2, wherein:

the plane of said guides are perpendicular to the plane of said rack; and, the plane of the central tooth of said rack is perpendicular to said guides.

* * * * *